Sept. 21, 1965   G. F. KEELERIC   3,206,847
METHOD FOR JOINING METAL PIECES AT SPACED INTERVALS
Filed March 16, 1962   2 Sheets-Sheet 1
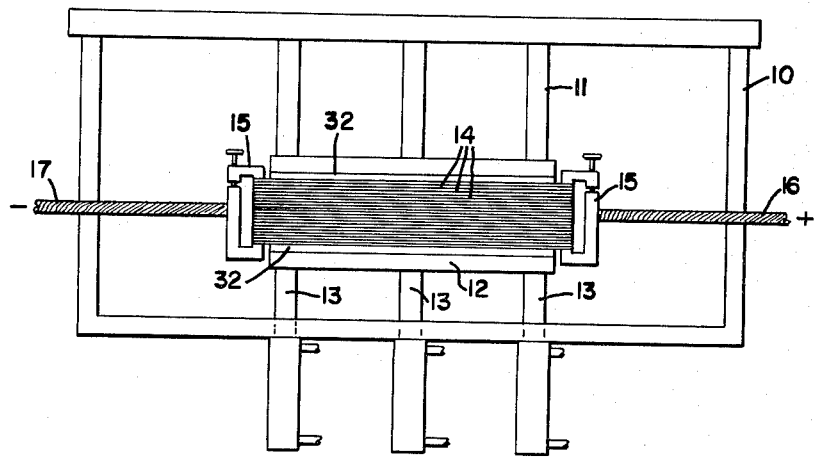
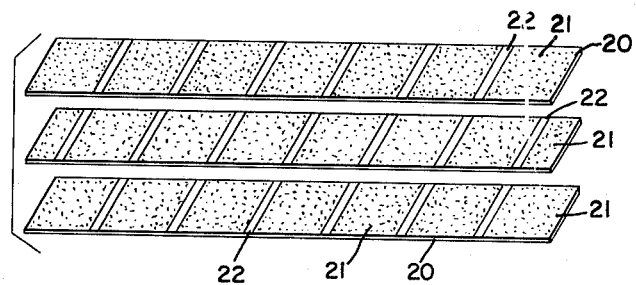
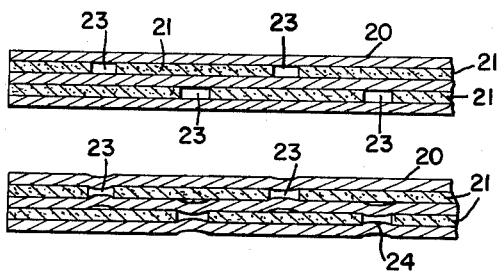
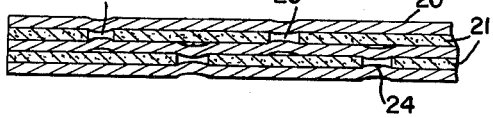
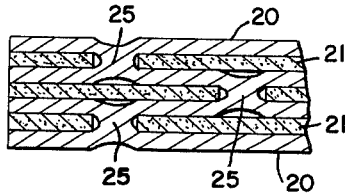
INVENTOR
George F. Keeleric
BY
Townsend and Townsend
attorneys Sept. 21, 1965  G. F. KEELERIC  3,206,847
METHOD FOR JOINING METAL PIECES AT SPACED INTERVALS
Filed March 16, 1962  2 Sheets-Sheet 2
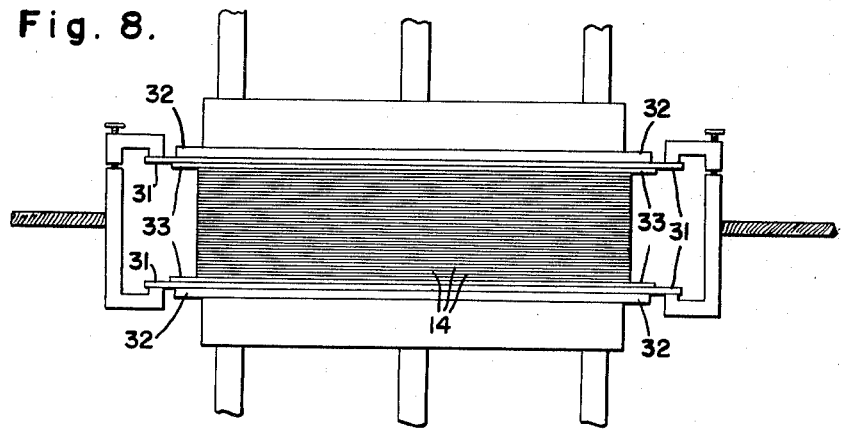
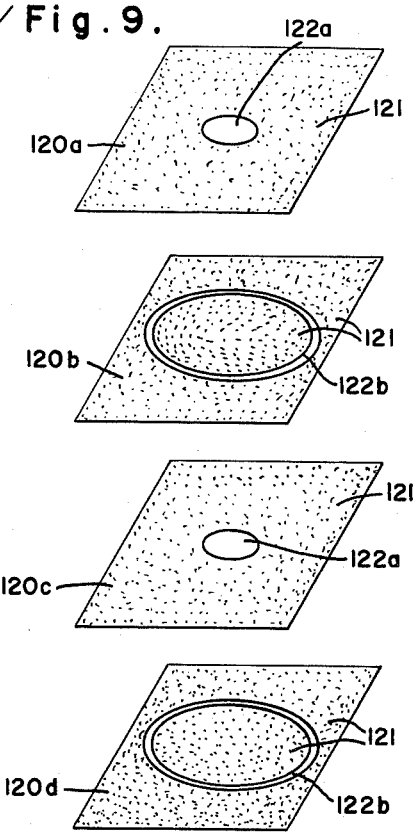
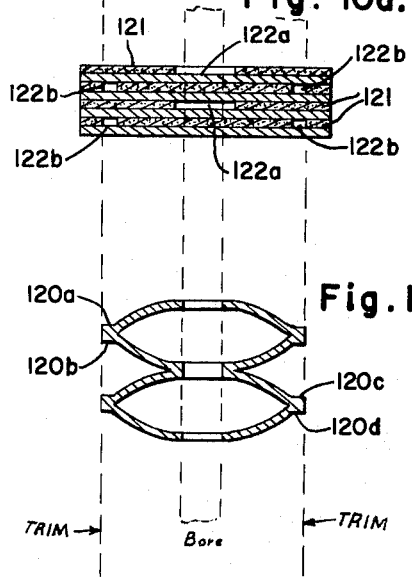
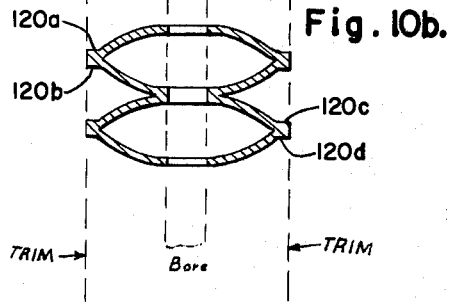
INVENTOR.
George F. Keeleric

United States Patent Office 3,206,847
Patented Sept. 21, 1965

3,206,847
METHOD FOR JOINING METAL PIECES
AT SPACED INTERVALS
George F. Keeleric, Santa Monica, Calif.
(Big Sur, Calif.)
Filed Mar. 16, 1962, Ser. No. 180,129
6 Claims. (Cl. 29—480)

This invention relates to the art of diffusion welding together webs, ribbons or sheets (which terms are used synonymously herein) of metal foil or thin gauge sheet metal material only at spaced apart preselected areas between adajcent sheets. The invention will be more or less specifically described in reference to a method of welding together adjacent sheets of thin gauge metal foils contained in a stack of many such sheets, for the purpose of creating honeycomb type material. As will be seen, the broader concepts of the invention are not necessarily confined to the manufacture of honey comb or any other specific type of welded product.

In general, the present invention relates to and constitutes an improvement over the subject matter of co-pending United States patent application, Serial No. 666,383, filed June 18, 1957.

In the prior aplication referenced above, it is disclosed how a relatively large number of metal foils or ribbons can be diffusion welded at spaced pre-selected points in such manner as to provide an unexpanded stack of welded honeycomb material. In general, the method as taught in the prior referenced application involves the steps of applying to the plurality of ribbons to be welded bands or lines of a weld-preventing "stop-off" material where welding between the ribbons is to be prevented.

The spaces where no stop-off material is applied define weld contact or "node" areas where the welding between the ribbons is to occur. In order to insure metal-to-metal contact between the ribbons or foils in a stack at the uncoated node areas thereof, the prior aplication disclosed various ways for mechanically building up, or backing up, the node contact areas (to compensate for the measurable thickness of the stop-off coating between adjacent foils) when welding pressures and temperatures were applied to the stack. Such prior application further disclosed that a stack of such foil could be placed in a non-oxidizing atmosphere and subjected to static compressional forces at elevated temperatures near, but somewhat below, the melting point of the metal to cause the foils to weld by diffusion to one another at pre-selected node points.

In general, the practice of the present invention involves the steps of superposing into a stack a plurality of flat metal foil webs or sheets with spaced areas of a weld stop-off material disposed between adjacent foil layers. The stop-off material, no matter how thin the coating, has a finite or measurable thickness, and, therefore, the uncoated node areas between the spaced stop-off areas will define void spaces between the layers of superposed planar foils within a stack.

The present invention involves the novel steps of heating the stack to an elevated temperature less than normal heat-welding temperature and during the heating process subjecting the stack to static pressure in such a manner as to employ the mutual friction of the member foils to restrict unlimited longitudinal thermal expansion of the foils in the direction of their planes. By this means, the foil ribbons are caused to bendably deform and expand or project into the void spaces at the node areas and cause adjacent foils in the stack to come into contact with one another under diffusion welding pressure.

More specifically, it is the principal object of the present invention to cause the uncoated node areas in a stack of metal foil to bendably distort and press against adjacent foil surfaces by confinement of lateral expansion forces and without the use of mechanical devices to back up the node areas.

As above indicated the invention can be readily described in reference to the manufacture of welded honeycomb structures. By way of further example, and not by way of limitation, the invention is also particularly suitable for producing welded metal bellows of a type conventionally used to provide gas tight piston shaft seals leading to gas or vacuum chambers or the like. More specifically, the present invention provides a method particularly suitable for fabricating various types of bellows and the like from the superimposed layers of metal foil, such as stainless steel, or the like, which includes the steps of printing or otherwise creating on the sourface of strips of foil, patterns of stop material adapted to define diffusion welding areas, said areas being located on the foil surfaces at those portions of the foil which constitute the major and minor diameters of the contemplated bellows. The subsequent steps of the method of fabricating the bellows by diffusion welding includes the superimposition of the strips or sheets of foil with their surfaces and stop areas in abutting relationship and the subjection of said superimposed strips or sheets to heat and pressure to complete the diffusion welding operation. Among the advantages which are inherent in the application of the method of my invention to such structures as bellows, is the fact that the formation of relatively rigid, brittle welding areas or lines in the metal constituting the bellows is eliminated. This results in a structure which can be subjected to higher pressures and which may be expanded or contracted a far greater number of times than conventional structures since the welding areas or lines of conventional structures cause premature failure of the bellows at said welding areas due to the fact that said welding areas or lines act as hinge points causing the adjacent metal to break away. Another advantage of the invention is the fact that, since a relatively large number of sheets or strips of foil may be superimposed upon one another, bellows of almost any practical length can be readily fabricated as unitary structures without the necessity for tne complicated manufacturing processes and handling problems encountered in the use of conventional methods.

Other objects of the present invention will become apparent upon reading the following specification and referring to the accompanying drawings in which similar characters of reference represent corresponding parts in each of the several views.

In the drawings:

FIG. 1 is a schematic illustration of an enclosure wherein atmosphere can be controlled, and adapted to provide static pressure upon a stack of foil material within the enclosure;

FIG. 2 is a perspective view of three foil ribbons in exploded relation illustrating the coating of the surfaces with a stop-off material except for node areas which are to be welded;

FIG. 3 is a representation of the alternate spacing of the node areas in the plurality of stacked foil ribbons, and employs the technique of exaggerating the thickness of the stop-off material in order to illustrate the spacing effect which this material has;

FIG. 4 is an enlarged fragment of the stack shown in FIG. 3, further illustrating the spacing of the node areas and emphasizing by exaggeration the spacing effect of the stop-off material used to prevent weld between the nodes;

FIG. 5 illustrates the condition prevailing in the structure of FIG. 1 upon the application of heat to the stack causing the stack to expand into the void spaces at the node areas;

FIG. 6 illustrates a much enlarged fragmentary section of a stack of foil material after the node areas have been diffusion welded;

FIG. 7 is a section of honeycomb after the stack is welded and expanded, the particular section being a substantially square cell configuration;

FIG. 8 is a view similar to FIG. 1 but especially adapted to use strip-heaters to heat the stack of metal foils; and FIGS. 9 and 10 illustrate the manner in which sheets of foil may be imprinted with stop weld barriers and diffusion welded in bellows fabrication.

To illustrate the invention in more detail, the drawing sets forth a somewhat schematic arrangement of the apparatus and the physical nature of the stack of foil as it is prepared for welding, during the welding process, and after being welded.

FIG. 1 of the drawings illustrates schematically an enclosure 10 which may be referred to generally as a furnace or oven. This enclosure enables the control of contaminant free atmosphere within the enclosure either by evacuating air from the chamber or by the introduction of an inert gas atmosphere into the enclosure. Whether or not a controlled atmosphere is necessary or desirable depends upon the type of metal being weld. Generally, I would regard it advisable to weld in an oxygen free and/or otherwise contaminant free condition in working with metals such as stainless steel, aluminum, or some of the more exotic metals such as titanium alloys, etc. Other less reactive metals, such as copper, for example, may be welded in an air atmosphere.

A stack of foil ribbons or webs is indicated by the reference character 14. This stack is physically compressed between a stationary press bed 11 and a movable press platen 12. Platen 12 is forced toward the bed 11 by means of hydraulic rams 13. There is no illustration of the source of hydraulic pressure and controls for the rams 13, this being known and understood apparatus available for such purposes.

The method of heating the stack within the press to diffusion welding temperature is largely a matter of choice or design and will depend to some extent upon the type and physical characteristics of the metal foils to be welded. For example, in welding foils of electrically non-resistant character, such as copper, it is feasible to employ resistance element strip heaters placed at the top and bottom of the stack within the press, whereby heat from the strip heaters will be transferred by conduction to all of the foils in the stack.

FIG. 8 of the drawings shows such an arrangement which includes top and bottom strip heaters 31 which may consist of stainless steel foils or other relatively high resistant metal alloys and which are connected at their opposite ends to an electric current source. Disposed between each strip heater 31 and adjacent pattern 12 of the press 11 is a sheet of thermal insulation material 32. The insulating pieces 32 electrically insulate the strip heaters from the press and also curtail reverse heat loss or transfer from the strip heaters to the press platens. Disposed between each strip heater and the stack of foils 14 is a thin sheet 33 of electrically insulative material, such as thin sheet mica, asbestos, or the like. Preferably, the insulation material 32 is made as thin as possible so as to provide a media that will not unduly impede heat transfer by conduction from the strip heaters 31 to the stack of foils 14. As above indicated, the use of strip heaters may be regarded as particularly desirable when the stack of foils 14 consist of a high electrically and heat conductive metal, such as copper.

When the stack of foils 14 comprise stainless steel or other metals or alloys having a fairly high degree of electrical resistance, the stack itself may be employed as a resistance heater per se by passing current directly through the stack from one end thereof to the other. Thus, for example, in FIG. 1 the stack of foils 14 is electrically and thermally insulated from the press platens 12 by insulating sheets 32 similar to the sheets 32 described in reference to FIG. 8. The stacks of foils 14 is heated electrically by passing a current from a source 16 through clamps 15 attached adjacent each end of the stack to ground 17. Thus, and as above indicated, the stack of foils 14 serves as its own resistance heating element.

In FIG. 2, three foil ribbons 20 are illustrated as suggestive of the type of foil which may be employed in the making of honeycomb. Throughout the illustration, only a minimum number of foil sheets are illustrated, it being understood that actual practice may involve the use of hundreds of such foils in a single stack to produce honeycomb type materials.

Welding by pressure is old and well known. Furthermore, prevention of welding by the use of stop-off material is also known in the art. There are many compositions suitable for such purpose, and each composition will serve best with respect to particular types of metal. Stated otherwise, each particular welding condition and type of metal will operate best with stop-off material suited to that particular material and condition. Illustrations of specific examples will be set forth hereinafter.

In the drawings, areas of such stop-off material are indicated by reference character 21. In the illustration chosen for the drawing, a square shaped expanded cell is created, and hence the stop-off areas 21 are considerably larger than the remaining node areas 22. This stop-off material may be applied to one surface only of each foil and is provided for the purpose of preventing its adjacent foil juxtaposed relative thereto from welding to it in any place except the uncoated node area. In order to produce a honeycomb configuration, the node areas of alternate foils are staggered in their relationship as best illustrated in FIG. 3.

It is noted that for purpose of clear illustration, the drawings show the stop-off material as perhaps having a somewhat exaggerated thickness relative to the thickness of the foil material to be welded. However, referring to FIG. 4, it will be appreciated that any stop-off material does in fact separate the foil ribbons because it does have an appreciable or finite thickness, however small that thickness may be. This finite thickness then results in a void or space 23 being formed between adjacent foils in the node area 22 as defined by the uncoated surfaces of the foil between the areas of the stop-off 21. Obviously, however, the bottom uncoated surfaces of each foil and the top uncoated surfaces of it sadjacent lower foil in the stack must come together under pressure for a period of time in order to create a diffusion weld. According to this invention, controlled use of the natural phenomena of thermal exponsion of the metal foils is employed to accomplish the bringing of the uncoated surfaces of the foils together for diffusion welding.

More specifically, by placing the stack 14 under compression in the press, mutual interface friction will exert forces tending to limit normal thermal expansion of the material with respect to the various layers, and the amount of restraining force can be controlled by the degree of pressure applied by the hydraulic rams 13.

When each foil strip is heated, the increase in the molecular activity in the metal causes the metal to expand. Expansion of the stack along the natural plane of the foils is limited by the pressure applied to the foil layers above described. Consequently, the foils begin to distort —i.e., bend—and move into the void area or spaces 23, as illustrated in FIG. 5. It will be seen that distorted projections 24 are moving toward one another to fill the spaces 23.

FIG. 6 of the drawings illustrates the effect of this contact under pressure for a period of time at elevated temperatures. The effect is production of diffusion weld areas 25. These are the areas 25 in FIG. 7 which unite the foils as a unitary structure after the honeycomb is expanded by any suitable means to open cell configuration.

As thus far described, a fully useful disclosure has been set forth which may be practiced by anybody skilled in this art and having a knowledge of metallurgical phenomena. However, in order to illustrate the invention more fully and give further guidance for the complete utilization of the invention, the following examples of material and procedures are given:

EXAMPLE 1

Foil Material—Copper.
Stop Off Formulation—360 gm. MgO USP Heavy, 330 gm. Process Varnish, 110 gm. Odorless Mineral Spirit.
Foil Gauge—.002".
Thickness of Stop Off Material Applied—.001"–.003".
Pattern Dimensions—.045" node, with .2786" pitch between nodes in the stack before expansion.
Number of Ribbons—167.
Method of Applying Stop Off—Silk screen.
Source of Heat—Strip heaters located along the top and bottom foils of the stack.
Atmosphere—Air.
Welding Cycle—Initial pressure applied to the stack was 900 p.s.i. until stack temperature reached 400° F. at which time pressure momentarily relieved to 0 p.s.i. Pressure of 900 p.s.i. re-established until stack temperature reached 700° F. whereupon pressure again momentarily released to 0 p.s.i. and then re-established at 900 p.s.i. until temperature of 1000° F. reached. At reaching temperature of 1000° F. pressure relieved to 450 p.s.i. and held constant at this latter pressure until temperature of 1700° F. reached at which time both the temperature of 1700° F. and pressure of 450 p.s.i. held constant for 10 minutes.
Method of Cooling the Honeycomb Stack before Expansion—Turn power off and let cool under pressure.
Method of Expansion—By tape expander device similar to that disclosed in U.S. Patent No. 2,674,295.
Method of Stop Off Removal—Acid bath consisting of: 4 parts by weight of concentrated $H_2SO_4$; 10 parts by weight of $NA_2CR_2O_7$; 30 parts by weight $H_2O$.

EXAMPLE 2

Foil Material—316L Stainless Steel.
Stop Off Formulation—360 gm. MgO USP Heavy, 330 gm. Organic Varnish Binder, 110 gm. Odorless Mineral Spirit.
Foil Gauge—.006".
Foil Composition—CO, .03% max.; Mn, 2% max.; Si, 1% max.; PO, .04% max.; SO, .03% max.; Cr, 16%–18%; Ni, 10%–14%; Mo, 2%–3%.
Thickness of Stop Off Material—.001"–.003".
Pattern Dimensions—.060" node spaced .5366".
Number of Ribbons—144.
Method of Applying Stop Off Material—Silk screen.
Source of Heat—Current passed directly through stack.
Atmosphere—Vacuum of between 65–100 microns.
Welding Cycle—A stack of foils was heated rapidly from room temperature to 200° F. in a vacuum of 65 microns and thence was heated from 200° F. to 400° F. over a period of 15 minutes without any pressure from the press applied to the stack. Upon reaching 400° F. the press was closed to 1,200 p.s.i. and the foils heated to 1,800° F. in a period extending somewhat over 15 minutes and in a vacuum of approximately 100 microns. Upon reaching 1800° F. the pressure was lowered to 840 p.s.i. and the stack then heated to a temperature range of between 2,000–2,100° F. where it was held for 30 minutes at a substantially constant pressure of 840 p.s.i.
Method of Cooling the Honeycomb Stack Before Expansion—Turn power off and let cool under vacuum and pressure.
Method of Expansion—By tape expander device similar to that disclosed in U.S. Patent No. 2,674,295.
Method of Stop Off Removal—Acid bath consisting o 4 parts by weight concentrated $H_2SO_4$; 10 parts 1 weight $NA_2CR_2O_7$; 30 parts by weight $H_2O$.

The above examples indicate at least two types widely varying materials which can be successfully form( into honeycomb structure according to the concepts this invention.

It is observed that in each example given above, cor pression on the stack so as to oppose longitudinal therm expansion of the foils was not maintained throughout tl full heating cycle. The examples indicate that as tl stack was heated to final temperature, static pressu was applied and released and reapplied from time to tim It is pointed out that the invention is operative to cau diffusion welding of foils even if full compression maintained on the stack during the entire heating cycl However, experiments and empirical practice in refe ence to working with various types of metal and met alloys indicate that to obtain optimum results as to ur formity of cell configuration of honeycomb or the lik it is usually desirable to limit, rather than try to absolute prohibit, the normal thermal expansion of the foils their flat planes during the entire heating cycle. F( example, if no perceptible flat planar expansion whats( ever of the foils is permitted to occur, it is probable th: the entire stack of foils will show signs of buckling ( wavy wrinkling throughout its length. Such occurren( will usually not effect the solidarity of the diffusion we: areas, but it may cause unevenness in the ultimate ce configuration desired in the final expanded honeycom product. FIGS. 9 and 10 disclose how the method ( the present invention may be used to provide diffusic welding between adjacent metal foils 120a, b, c, and to which have been applied substantially circular areas ( weld stop-off material having a finite thickness. In th connection FIG. 9 indicates a pattern of weld stop-o suitable for use in the making of metal bellows used fc piston seals or the like in vacuum or gas chambers ; above stated. More specifically, the upper face of ever other foil is provided with weld stop-off material 121 1 define an uncoated circular weld contact area 122a wher( as alternate in-between foils each define an annular ui coated metal weld area 122b. When the foils are supe posed in a stack and subjected to heat and pressure a( cording to the invention the foils will tend to bendabl deform and expand in areas offering least resistance 1 expansion, which as shown in FIG. 10a will be the voi spaces defined by the circular and annular bare met: areas 122a and 122b respectively. After diffusion wel( ing of the foils together at said areas 122a and 122( excess metal may be bored from the center and machine or trimmed off around the outside perimeter (as ind cated in FIG. 10b by dotted lines) to define a welde bellows-like structure having the desirable characterist( advantages earlier mentioned herein.

Although the foregoing invention has been describe in some detail by way of illustration and example fc purposes of clarity of understanding, it is understood th: certain changes and modifications may be practiced witl in the spirit of the invention as limited only by the scop of the appended claims.

I claim:

1. In the art of diffusion welding a plurality of webs c metal together only at preselected weld areas the stef comprising: stacking a plurality of said webs one upo the other with preselected surface areas of adjacent sheet that are not to be welded separated by a layer of finit thickness of a weld stop-off material and with the pr( selected surface areas of adjacent sheets to be welde separated by a void space defined by the thickness of spacing between the stop-off material; heating said stac to diffusion welding temperatures and to cause said web to thermally expand, forcefully restricting the therm( expansion of the said webs in their normal planes of e> pansion to cause said webs to bendably distort and e> d into said void spaces whereby the preselected weld
as of adjacent webs come into contact with one another, while maintaining static pressure on said stack to
are welding between the contacting distorted surface
as of adjacent webs in said stack.

. The method of claim 1 wherein the thermal expansion of said webs as above described is accomplished by
trolling the amount of static pressure applied to the
:k during heating thereof.

. The method of uniting spaced preselected surface
as of adjacent metal sheets in a stack comprising the
)s: providing a plurality of sheets to be welded; placing said sheets in a stack with interspersed layers of weld
venting stop-off material separating all areas not to be
ded, said placement resulting in void areas between
acent sheets where there is no stop-off material; applying static pressure to said stack in an amount insufficient
cause any appreciable reduction in thickness of the
ets in the stack yet sufficient to prevent unlimited
rmal expansion thereof along the normal planes of the
ets when said stack is heated as hereinafter specified;
lying heat to the stack resulting in expansion forces
the sheets creating a tendency to expand along the
nar direction of the sheets, whereby the sheets will
orm into said void areas and said surfaces will contact with a force proportionate to the degree of heat applied and restriction of expansion by friction; and maintaining said conditions of stack pressure and heat until
usion welding has taken place between the contacted
faces.

. The method of forming a plurality of thin flat
al sheets into a honeycomb structure comprising the
)s of applying to the top face of each sheet a plurality
areas of weld stop-off material with uncovered node
as formed therebetween; stacking the sheets with the
e areas in staggered relation; compressing the stack
er sufficient pressure to create frictional restriction to
rmal expansion along the planar direction of the
ets but under insufficient pressure to cause any appreciable reduction in thickness of the sheets in the stack;
ting the sheets in the stack to create forces of expansion along said planar direction, whereby the sheets will
and into the node areas and contact one another under
:e; holding the stack under pressure and heat until
usion welding of adjacent sheets has taken place in
node areas; and finally expanding the stack into a multiplicity of interconnected cells.

. A method of making honeycomb core, the steps including: applying preselected surface areas of webs of
usion weldable metal foil material spaced parallel
pes of a weld stop-off material; the spaces between said
pes defining uncoated node areas; said stripes having
a finite thickness projecting slightly beyond the planar
surfaces of each web to which said stripes are applied;
susperposing into a stack a plurality of layers of said web
material with stripes of stop-off disposed between adjacent layers, and with the stripes between alternate layers disposed parallel but in staggered relation to one another; the said stripes of finite thickness spacing the node
areas of each layer from contact with corresponding
node areas of each adjacent layer thereby definining void
spaces between layers at the node areas; applying heat
from an external heat source to said stack to cause heating
of said stack while subjecting said stack to static compressional forces applied uniformly simultaneously throughout the entire stack in an amount insufficient to cause any
appreciable reduction in thickness of the sheets in the
stack yet sufficient to prevent unlimited thermal expansion
thereof along the normal planes of the sheets; while subjecting said stack to said heat and compressional forces
limiting the thermal expansion of the sheets in their normal planes to cause the metal foil defining opposite node
areas of adjacent layers to bendably distort and occupy
the said void spaces and to come into contact with one another under welding pressure and temperature whereby
said node areas of adjacent sheets become diffusion welded
to one another.

6. The method of securing selected surface areas of
superimposed metal sheets in operative relationship with
each other including the steps of: applying isolating material to surfaces of said sheets to define welding areas adjacent said isolating material, said isolating material being
of finite thickness; placing said sheets in superimposed
relationship; subjecting said stack of sheets to pressure in
an amount insufficient to cause any appreciable reduction
in thickness of the sheets in the stack yet sufficient to
prevent unlimited thermal expansion of said sheets in
their normal planes of expansion when subjected to heat;
applying heat to the stack to cause the metal sheets at
the welding areas to bendably distort and occupy voids
between the isolating material and to come into contact
with one another under welding temperature and pressure to cause said welding areas to be diffusion welded
to each other while maintaining said pressure and application of heat on said sheets.

References Cited by the Examiner
UNITED STATES PATENTS

| 2,999,306 | 9/61 | Baxter | 29—455 XR |
| 3,133,346 | 5/64 | Allen | 29—498 XR |

JOHN F. CAMPBELL, *Primary Examiner.*